April 21, 1925.
W. G. WOOD
CUTTER ATTACHMENT FOR PLOWS
Filed June 6, 1923
1,534,098
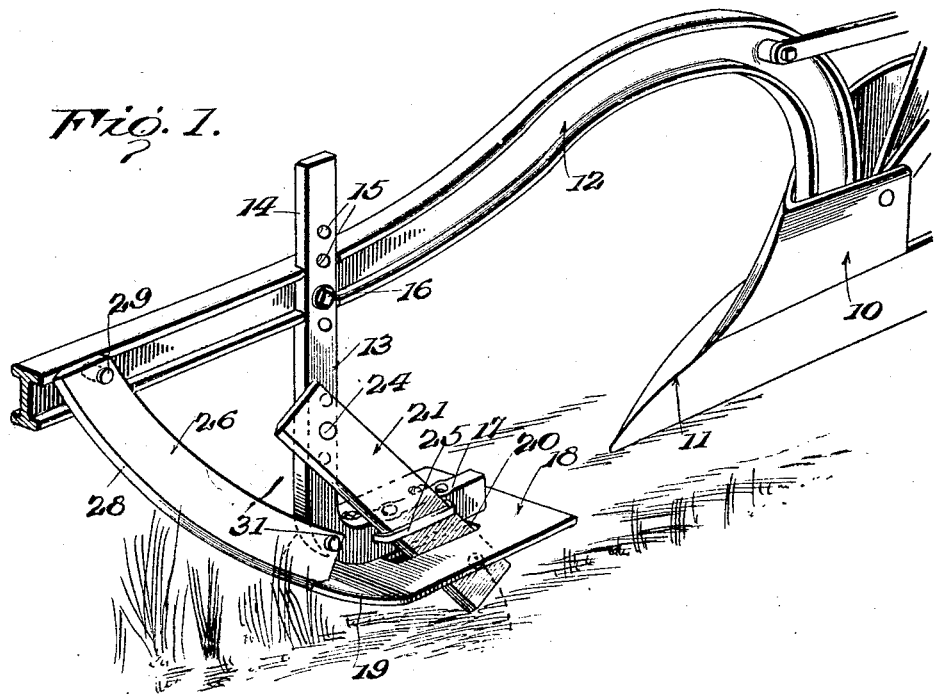
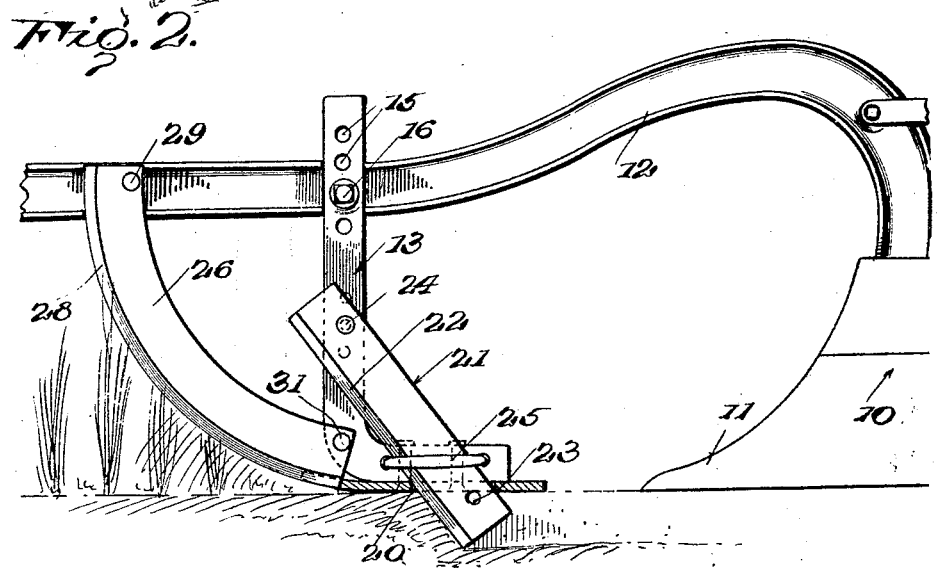
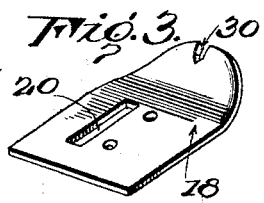
WITNESSES
INVENTOR
W. G. Wood.
BY
ATTORNEYS Patented Apr. 21, 1925.

1,534,098

UNITED STATES PATENT OFFICE.

WALTER GEORGE WOOD, OF FELLSMERE, FLORIDA.

CUTTER ATTACHMENT FOR PLOWS.

Application filed June 6, 1923. Serial No. 643,723.

*To all whom it may concern:*

Be it known that I, WALTER G. WOOD, a citizen of the United States, residing at Fellsmere, in the county of St. Lucie, State of Florida, have invented certain new and useful Improvements in Cutter Attachments for Plows, of which the following is a specification.

This invention relates to improvements in cutter or colter attachments for plows.

As is well known sodded fields or fields with a heavy growth of relatively long grass or weeds is difficult to break or plow; and it is the object of the present invention to provide a colter or cutter adapted to be attached or secured to any standard type of mouldboard plow and operate in an exceedingly efficient manner for cutting sod or grass forward to the plow associated therewith.

It is also an object of the invention that there be incorporated with the cutter attachment a shoe or runner whereby to pack the grass or weeds over which the shoe may pass and thereby to further aid the associated plow to efficiently turn the grass or weeds beneath the soil.

Other objects, and objects relating to details of construction, combination and arrangement of parts, will hereinafter appear in the detailed description to follow.

The invention is illustrated by way of example in the accompanying drawings, in which:—

Figure 1 is a fragmentary perspective view of a plow and showing the application of the present invention, Figure 2 is a fragmentary view in side elevation of a plow with the device of the present invention applied and also showing the shoe in longitudinal section in order to more clearly illustrate the arrangement of the cutters employed, and Figure 3 is a detail view of the shoe.

Referring to the drawings, more particularly, 10 indicates generally a plow of the landside type and which is provided with the usual point 11. The beam 12 is preferably metal and of the usual construction.

In carrying out the present invention there is provided a standard or supporting member 13 which is L-shaped as shown and which has its portion 14 provided with a plurality of openings 15, whereby a bolt 16 may be utilized for adjusting bolting the standard 13 to a plow beam 12. The lower end portion 17 of the standard 13 extends rearwardly, as shown, and to this portion there is bolted a shoe 18, said shoe being in the form of a plate and having an upwardly curved portion 19 at its forward end. The shoe 18 is provided with a longitudinally extending slot 20, said slot occurring adjacent the inner side of the shoe with respect to the plow 10, and this slot 20 is adapted to accommodate a cutter 21, said cutter being in the form of a plate as shown and having its longitudinal and forward edge provided with a cutting edge, as at 22. The member 21 is provided adjacent each end with an opening 23, and a bolt 24 is extended through one of these openings and also through a suitable opening in the standard 13, whereby to secure the blade or knife in the position shown in the drawings. This blade or knife extends downwardly through the slot 20 in the shoe 18 and projects beneath the shoe. As shown in Figures 1 and 2 the knife blade is inclined and its lower end portion is positioned so that it will cut the sod immediately beneath the shoe 18. Also this blade 21 is in alignment with the point 11 of the plow 10. The reason for providing an opening 23 adjacent each end of the blade 21 is to permit the same to be reversed and thereby enable both ends of its cutting edge to be utilized, that is, when the cutting edge at one end of the blade becomes dull then said blade may be reversed and the cutting edge at its other end utilized. The rear edge of the cutting blade engages with the rear end wall of the slot 20 as shown. The blade 21 is further secured to the standard 13 by a U-shaped clamp 25, said clamp member being adapted to straddle the blade and having its leg portions extending through suitable openings in the rearwardly extending portion of the standard 13. The clamp 25 may be secured in position by means of nuts threaded upon the leg portions thereof. A second knife or blade 26 is provided which is arcuate in shape as shown and comprises a plate member having its forward edge bevelled to provide a cutting edge 28. This member is provided with an opening adjacent each end as shown, and the upper end is secured to the plow beam by a bolt 29, while the lower end projects into a notch 30 formed in the forward end of the shoe 18 and this end is secured to the standard 13 by a bolt 31. The plate 26 may also be reversed in order that the cutting edge at each end of the member may be utilized. In the use of the form of cutter or colter previously described, the shoe 18 is adapted to move over the grass or sod and pack the same, while the portion of the blade 21 extending beneath said shoe is adapted to cut the soil. In order to facilitate the operation of the plow 10, the blade 26 precedes the shoe 18 and this blade serves to cut and separate the grass forward to the shoe.

It has been found that a plow equipped with this form of cutter or colter will operate to efficiently plow or break a sodded field or a field covered with a thick growth of grass. With the forward movement of the plow the blade 26 cuts or severs any long grass that may be present in the field and the shoe 18 follows this blade and packs the grass therebeneath. The blade 21 cuts the sod or turf and thus enables the point 11 of the plow 10 to easily enter the soil, and in this way efficiently turn the sod or grass beneath the soil. It is to be noted that the present device can be easily applied to any standard form of beam construction or plow, and further that the device is durable and inexpensive to manufacture.

While I have shown and described the preferred form of my invention, I wish it to be understood that I am aware of the fact that the construction, combination and arrangement of parts may be changed by those skilled in the art without departing from the spirit of the invention, as indicated by the appended claims.

I claim:

1. In combination with a plow of the character described, a ground-engaging shoe secured to the beam of said plow and adapted to move forward to the plow, whereby to crush and pack weeds or the like, a cutter projecting beneath said shoe and in alignment with said plow, and a second cutter extending between the forward end of the shoe and the beam.

2. In combination with a plow of the character described, an L-shaped standard having its one end adjustably secured to the beam of said plow and its other end portion extending rearwardly, a ground-engaging plate carried by the last-named portion of the L-shaped standard, a blade secured to the standard at its one end and extending through a slot in said ground-engaging plate, whereby to sever the soil over which said ground-engaging plate may pass.

3. In combination with a plow of the character described, an L-shaped standard having its one end adjustably secured to the beam of said plow and its other end portion extending rearwardly, a ground-engaging plate carried by the last-named portion of the L-shaped standard, a blade secured to the standard at its one end and extending through a slot in said ground-engaging plate, whereby to sever the soil over which said ground-engaging plate may pass, and means for clamping the blade to the rearwardly extending portion of said L-shaped standard.

4. In combination with a plow of the character described, a standard adapted to be secured to the beam and depending therefrom, a ground-engaging plate carried by the lower end of said standard, said plate having an elongated longitudinally extending slot, a blade comprising a plate member with its one edge bevelled to provide a cutting edge, said blade having an end portion extended through the slot in the plate and its other end detachably secured to the standard, whereby said blade may be reversed, for the purpose described.

5. In combination with a plow of the character described, a standard adapted to be secured to the beam of a plow and depending therefrom, a blade secured between said standard and the forward end of the beam, said blade comprising a plate with one longitudinal edge beveled to provide a cutting edge, and said blade being reversible, for the purpose described.

WALTER GEORGE WOOD.